(12) United States Patent
van Dijk et al.

(10) Patent No.: US 12,113,647 B2
(45) Date of Patent: Oct. 8, 2024

(54) CONTROLLER AREA NETWORK APPARATUS WITH RECONFIGURATION SIGNALLING

(71) Applicant: NXP B.V., Eindhoven (NL)

(72) Inventors: Lucas Pieter Lodewijk van Dijk, Kranenburg (DE); Martin Wagner, Norderstedt (DE); Gerald Kwakernaat, Malden (NL)

(73) Assignee: NXP B.V., Eindhoven (NL)

( * ) Notice: Subject to any disclaimer, the term of this patent is extended or adjusted under 35 U.S.C. 154(b) by 61 days.

(21) Appl. No.: 18/172,142

(22) Filed: Feb. 21, 2023

(65) Prior Publication Data

US 2023/0291605 A1    Sep. 14, 2023

(30) Foreign Application Priority Data

Mar. 9, 2022  (EP) .................................... 22161031

(51) Int. Cl.
*H04L 12/40* (2006.01)
*H04L 41/0654* (2022.01)

(52) U.S. Cl.
CPC .... *H04L 12/40169* (2013.01); *H04L 41/0654* (2013.01); *H04L 2012/40215* (2013.01)

(58) Field of Classification Search
CPC ..... H04L 2012/40215; H04L 12/40169; H04L 41/0654; H04L 41/0681; H04L 41/0695; H04L 41/0668; H04L 41/0661; H04L 41/0659; H04L 41/0803; H04L 41/0813; H04L 41/0816

See application file for complete search history.

(56) References Cited

U.S. PATENT DOCUMENTS

| | | |
|---|---|---|
| 10,785,066 B1 | 9/2020 | van Dijk |
| 2015/0346259 A1 | 12/2015 | Jiang et al. |
| 2017/0371754 A1 | 12/2017 | Hofman |
| 2018/0359167 A1 | 12/2018 | Du et al. |
| 2019/0044750 A1* | 2/2019 | Granados .......... H04L 12/40169 |
| 2022/0376947 A1* | 11/2022 | Antonsson .............. H04L 12/40 |
| 2022/0393788 A1 | 12/2022 | Mueller et al. |
| 2023/0216705 A1* | 7/2023 | van Dijk ............... H04L 1/0045 710/305 |

OTHER PUBLICATIONS

U.S. Appl. No. 18/164,355 54 pages; Feb. 2, 2023.

* cited by examiner

*Primary Examiner* — Khanh C Tran

(57) ABSTRACT

An apparatus comprising a first and second terminal configured to couple the apparatus to a first and second bus wire of a communication bus; a transceiver arrangement for communicating with one or more network nodes via the communication bus, the transceiver arrangement configured to provide and receive differential signalling according to a communication scheme to/from the communication bus, wherein the communication scheme defines at least a voltage to be used to provide said differential signalling; the apparatus configured to: based on a fault detection signal indicative of the occurrence of a fault in at least the communication bus, transmit a reconfiguration signal for the network nodes and wherein at least part of the reconfiguration signal has a high-voltage-level comprising a voltage higher than that defined in the communication scheme for said differential signalling; and wherein said reconfiguration signal is configured to cause the network nodes to switch single-ended signalling.

20 Claims, 3 Drawing Sheets

CONTROLLER AREA NETWORK APPARATUS WITH RECONFIGURATION SIGNALLING

CROSS-REFERENCE TO RELATED APPLICATIONS

This application claims the priority under 35 U.S.C. § 119 of European patent application no. 22161031.4, filed Mar. 9, 2022, the contents of which are incorporated by reference herein.

FIELD

The present disclosure relates to apparatus for providing a reconfiguration signal. In particular, it relates to an apparatus for providing a reconfiguration signal to other nodes coupled to a communication bus to provide for collective switching to a single-ended communication mode. It also relates to a second apparatus configured to receive the reconfiguration signal and a method of operating a first apparatus and at least one second apparatus.

BACKGROUND

In-vehicle network (IVN) buses, such as CAN (Controller Area Network), CAN FD (CAN with Flexible Data-Rate), LIN (Local Interconnect Network), FlexRay, Ethernet based network buses, and other types, can be used for communications within vehicles. For example, controller area network (CAN) bus is a message-based communications bus protocol that is often used within automobiles. It will be appreciated that CAN networks also have application outside of the field of automobiles. A CAN bus network may include multiple bus devices, so called nodes or electronic control units (ECUs), such as an engine control module (ECM), a power train control module (PCM), airbags, antilock brakes, cruise control, electric power steering, audio systems, windows, doors, mirror adjustment, battery and recharging systems for hybrid/electric cars, and many more. The CAN bus protocol is used to enable communications between the various bus devices. The data link layer of the CAN protocol is standardized as International Standards Organization (ISO) 11898-1:2003. CAN Flexible Data-Rate or "CAN FD," which is an extension of the standardized CAN data link layer protocol and is meanwhile integrated into the ISO11898-1:2015 standard, can provide higher data rates. The standardized CAN data link layer protocol is being further extended to provide even higher data rates. A further extension, referred to as CAN XL, with a new level scheme allowing even higher data rates is in the definition phase discussed under CiA610 (CAN in Automation) and is moving towards standardization in the form of either a further update of the existing ISO11898 standards or a new standard.

SUMMARY

According to a first aspect of the present disclosure there is provided an apparatus comprising:
a. at least a first terminal configured to couple the apparatus to a first bus wire of a communication bus and a second terminal configured to couple the apparatus to a second bus wire of the communication bus;
b. a transceiver arrangement for communicating with one or more network nodes via the communication bus, the transceiver arrangement configured to provide differential signalling at the first terminal and the second terminal according to a communication scheme and receive differential signalling from the first terminal and second terminal from the communication bus according to the communication scheme, wherein the communication scheme defines at least a voltage to be used to provide said differential signalling;
c. the apparatus configured to:
d. based on a fault detection signal from a fault determination device, the fault detection signal indicative of the occurrence of a fault in at least one of the communication bus and one or more connections between the apparatus and the communication bus, transmit a reconfiguration signal, wherein the reconfiguration signal is provided for transmission via at least one of said first terminal and said second terminal for said one or more network nodes and wherein at least part of the reconfiguration signal has a high-voltage-level comprising a voltage higher than that defined in the communication scheme for said differential signalling; and
e. wherein said reconfiguration signal is configured to cause the one or more network nodes to provide for switching from use of differential signalling to single-ended signalling using only one of the first bus wire and the second bus wire.

In one or more embodiments, said apparatus comprises a Controller Area Network, CAN, transceiver.

In one or more embodiments, the apparatus is configured to provide a differential communication mode in which the transceiver arrangement is configured to transmit and receive the differential signalling, and a single-ended communication mode in which the transceiver arrangement is configured to transmit via a single one of the first terminal and the second terminal relative to a reference voltage; and
a. wherein the apparatus is configured to switch from the differential communication mode to the single-ended communication mode in response to said fault detection signal.

In one or more embodiments, one or both of:
a. the apparatus includes the fault detection device; and
b. the apparatus is configured to receive the fault detection signal from a different apparatus.

In one or more examples, the fault detection device is configured to detect faults in one or more of the communication bus and the one or more network nodes and, in response to detection of a fault, generate the fault detection signal.

In one or more embodiments, the reconfiguration signal includes at least a first part and a temporally subsequent part, wherein the first part is configured to communicate the occurrence of the fault to the one or more network nodes and to cause the suspension of the transmission of differential signalling over the communication bus by the one or more network nodes; and
a. the subsequent part is configured to communicate the start of the period of single-ended communication.

In one or more examples, said fault detection signal is indicative of a fault comprising at least one of a physical break in one of said first and second bus wires of the communication bus and a break in the one or more connections between the apparatus and the communication bus.

In one or more examples, the fault detection signal is an internal signal to the apparatus and is not provided to said communication bus.

In one or more embodiments, the fault detection signal has at least a first signal form and a different, second signal form; and a. wherein the first signal form is configured to cause the one or more network nodes to reconfigure to single-ended signalling using only said first bus wire; and
b. wherein the second signal form is configured to cause the one or more network nodes to reconfigure to single-ended signalling using only said second bus wire.

In one or more embodiments, the first signal form and the second signal form differ in terms of one or both of:
  a) the duration for which the reconfiguration signal is at said high-voltage-level;
  b) the duration for which the reconfiguration signal is at a lower voltage level than said high-level-voltage between a first period at the high-level-voltage and a second period at the high-voltage-level.

In one or more embodiments, the apparatus is configured to receive a first voltage from a first voltage source and a second voltage, greater than the first voltage, from a second voltage source, wherein said differential signalling provided by the transceiver arrangement is provided with reference to the first voltage and wherein the high-voltage-level is based on the second voltage.

In one or more embodiments, the reconfiguration signal is provided for transmission via the one of the first bus wire and second bus wire that does not have the fault indicated by the fault detection signal.

In one or more embodiments, the apparatus is configured to:
  a. based on receipt of the reconfiguration signal from said one or more network nodes, provide for switching from use, by said transceiver arrangement, of differential signalling to single-ended signalling using only one of said first bus wire and said second bus wire.

In one or more embodiments, the reconfiguration signal does not have the part that has the high-voltage-level and is identifiable to the other network nodes by a different feature thereof.

According to a second aspect of the disclosure, we provide a second apparatus comprising:
  a. at least a first terminal configured to couple the second apparatus to a first bus wire of a communication bus and a second terminal configured to couple the second apparatus to a second bus wire of the communication bus;
  b. a transceiver arrangement for communicating with one or more network nodes via the communication bus, the transceiver arrangement configured to provide differential signalling at the first terminal and the second terminal according to a communication scheme and receive differential signalling from the first terminal and second terminal from the communication bus according to the communication scheme, wherein the communication scheme defines at least the voltage to be used to provide said differential signalling; and
  c. the second apparatus is configured to:
  d. based on receipt of the reconfiguration signal received from the apparatus of the first aspect, provide for switching from use of differential signalling to single-ended signalling using only one of said first bus wire and second bus wire.

In one or more embodiments, said second apparatus comprises a Controller Area Network, CAN, transceiver.

In one or more embodiments, the reconfiguration signal includes at least a first part and a temporally subsequent part, wherein the first part is configured to communicate the occurrence of the fault to the one or more network nodes and to cause the suspension, by the second apparatus, of the transmission of differential signalling over the communication bus; and
  a. the subsequent part is configured to communicate the start of the period of single-ended communication.

In one or more examples, the second apparatus is configured to:
  a. based on a fault detection signal from a fault determination device, the fault detection signal indicative of the occurrence of a fault in at least one of the communication bus and one or more connections between the second apparatus and the communication bus, transmit a reconfiguration signal, wherein the reconfiguration signal is provided for transmission via at least one of said first terminal and said second terminal for one or more network nodes coupled to the communication bus and wherein at least part of the reconfiguration signal has a high-voltage-level comprising a voltage higher than that defined in the communication scheme for said differential signalling; and
  b. wherein said reconfiguration signal is configured to cause the one or more network nodes to provide for switching from use of differential signalling to single-ended signalling using only one of the first bus wire and the second bus wire.

According to a third aspect of the disclosure, we provide a method performed by a first apparatus configured to couple to a first bus wire and a second bus wire of a communication bus and at least one second apparatus configured to couple to the first bus wire and the second bus wire of the communication bus, the first apparatus and the second apparatus each comprising a transceiver arrangement for communicating with one another via the communication bus, each transceiver arrangement configured to provide differential signalling to the first and second bus wires according to a communication scheme and receive differential signalling from the first and second bus wires according to the communication scheme, wherein the communication scheme defines at least the voltage to be used to provide said differential signalling;
  a. wherein the method comprises:
  b. receiving, by the first apparatus, a fault detection signal from a fault determination device, the fault detection signal indicative of the occurrence of a fault in at least the communication bus and one or more connections between the first apparatus and the communication bus,
  c. transmitting, by the first apparatus in response to receipt of said fault detection signal, a reconfiguration signal via at least one of said first bus wire and second bus wire and wherein at least part of the reconfiguration signal has a high-voltage-level comprising a voltage higher than that defined in the communication scheme for said differential signalling; and
  d. receiving said reconfiguration signal by the second apparatus;
  e. switching, by the second apparatus in response to said receiving of the reconfiguration signal, from transmitting and receiving of the differential signalling to transmitting and receiving single-ended signalling using only one of the first bus wire and the second bus wire.

In one or more embodiments, there are a plurality of second apparatuses and the method comprises receiving, by the second apparatuses, the reconfiguration signal and collectively switching, by the second apparatuses in response to said receiving of the reconfiguration signal, from transmitting and receiving of the differential signalling to transmitting and receiving single-ended signalling using only one of said first bus wire and the second bus wire.

In one or more embodiments, said step of transmitting the reconfiguration signal comprises:
  a. transmitting the reconfiguration signal having either a first signal form and a different, second signal form; and
  b. wherein the step of switching comprises:
  c. switching, in response to receipt of said first signal form, to transmitting and receiving single-ended signalling using only said first bus wire; and
  d. switching, in response to receipt of said second signal form, to transmitting and receiving single-ended signalling using only said second bus wire.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

BRIEF DESCRIPTION OF THE DRAWINGS

One or more embodiments will now be described by way of example only with reference to the accompanying drawings in which:
  a.

DETAILED DESCRIPTION

Figure 1:
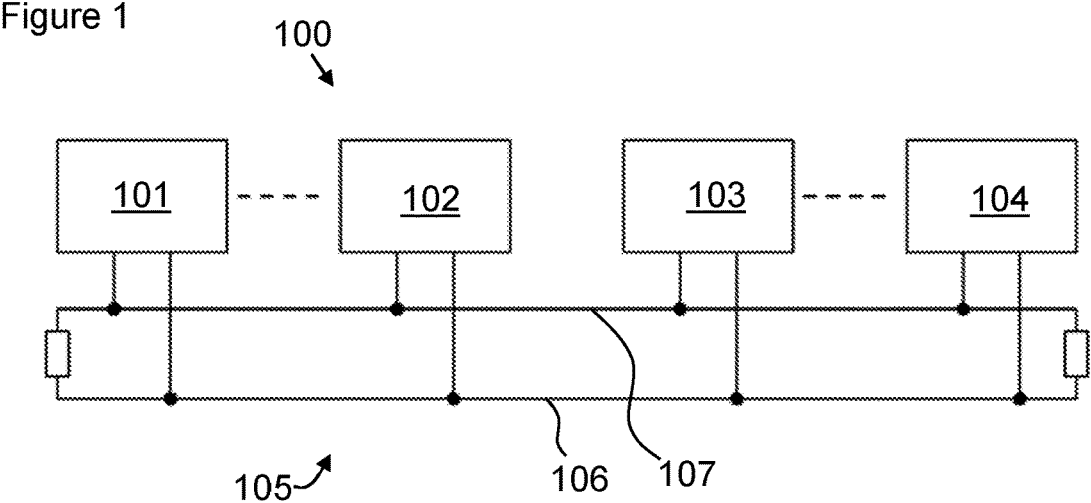
FIG. 1 shows an example embodiment of a plurality of CAN nodes connected to a common CAN bus;
  b.

Example FIG. 1 shows a communication bus based network 100 with a plurality of nodes 101-104 coupled to a common communication bus. The bus system 100 comprises a Controller Area Network, CAN, in this example. The plurality of nodes or ECUs (Electronic Control Units) 101-104 are connected to the same CAN bus wires 105 comprising a first wire 106, known as CANH, and a second wire 107, known as CANL. The nodes 101-104 may comprise nodes that implement Classical CAN, CAN FD nodes that implement the CAN FD protocol or CAN XL nodes that implement the new CAN XL protocol.

Figure 2:
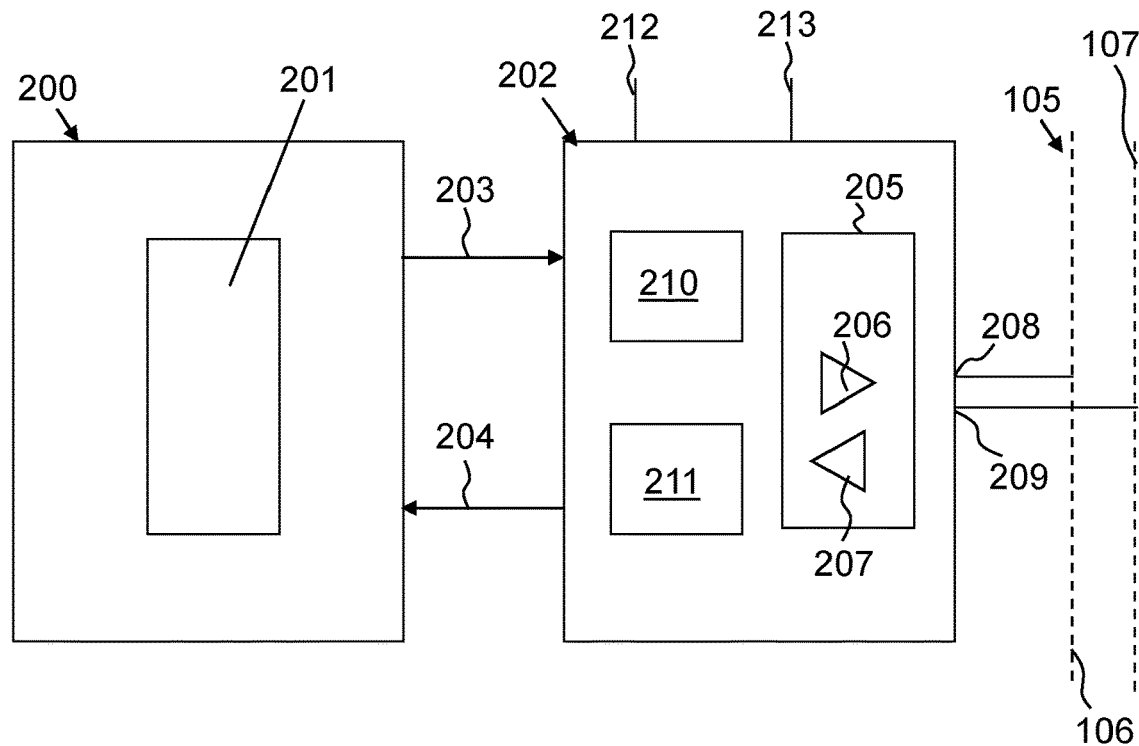
FIG. 2 shows an example CAN node comprising a CAN controller coupled with a CAN transceiver, the CAN transceiver providing the coupling to the CAN bus and wherein the CAN transceiver comprises an example of an apparatus for transmitting a reconfiguration signal;
  c.

Example FIG. 2 shows one of the nodes 101-104 in more detail. A node mainly comprises a CAN controller 200, such as a microcontroller, that implements the CAN, CAN FD or CAN XL protocol such as by using an embedded CAN, CAN FD or CAN XL protocol controller 201. The CAN controller 200 may be known as a host. The controller 200 and, more particularly, the protocol controller 201 is connected to the CAN bus 105 via a CAN transceiver 202. The CAN controller 200 is connected to the CAN transceiver 202 through two interface connections called TXD (Transmit Data) 203 and RXD (Receive Data) 204. The controller may therefore have a transmit output terminal that couples with a transmit input terminal of the CAN transceiver 202. Likewise, the CAN transceiver 202 may have a receive output terminal that couples with a receive input terminal of the CAN controller 200.

The examples described below relate to an apparatus that, in one or more examples, may comprise the CAN transceiver 202. However, it will be appreciated that the functionality of the apparatus described may be provided at least in part by the CAN transceiver 202. It will also be appreciated that while the example embodiments are described in the context of CAN, the apparatus may have wider application to other bus based networks.

The apparatus or transceiver 202 includes a transceiver arrangement 205 configured to generate differential signalling at the first terminal 208 and the second terminal 209 according to a communication scheme, i.e. the CAN protocol in this example. The transceiver arrangement 205 is also configured to receive differential signalling from the first terminal 208 and second terminal 209 from the communication bus 105 according to the communication scheme. As will be familiar to those skilled in the art, the communication scheme defines one or more details of the voltage, timing and encoding of the signals that are to be transmitted on and received from the bus 107. In the present example, the communication scheme defines at least the voltage to be used to provide said differential signalling.

In more detail, the transceiver arrangement 205 may be configured to convert transmit data, comprising a digital bit stream on TXD 203, into analogue, differential, signalling on the bus wires 105 using a transmitter module 206. The transceiver arrangement 205 may also be used to convert analogue signalling from the bus 105 into receive data comprising a digital output signal or bit stream by a receiver module 207 for providing to the RXD connection 204. The transmitter module 206 is thus configured to convert the transmit data into dominant bit and recessive bit differential signals for the bus 105. The receiver module 207 is thus configured to receive the differential signals from the bus 105 and determine the presence of either a dominant bit or a recessive bit and generate the receive data based thereon.

The transceiver 202 comprises a first terminal 208 configured to couple the transceiver 202 to a first bus wire 106 of the communication bus 105 and a second terminal 209 configured to couple the transceiver 202 to the second bus wire 107 of the communication bus 105.

In general, the CAN transceiver 202 and the transceiver arrangement 205 thereof comprises an interface device to the network bus and the CAN controller comprises a controller that is configured to transmit data to and receive data from the network via the interface device.

The CAN transceiver 202 is known as such because it has the purpose of acting as a transceiver for the CAN controller 200 and, as mentioned, the transceiver arrangement 205 provides this functionality. However, it will be appreciated by those skilled in the art that current CAN transceivers 202 may comprise other functionality in addition to the transceiver arrangement 205, as will be described in more detail later.

Figure 3:
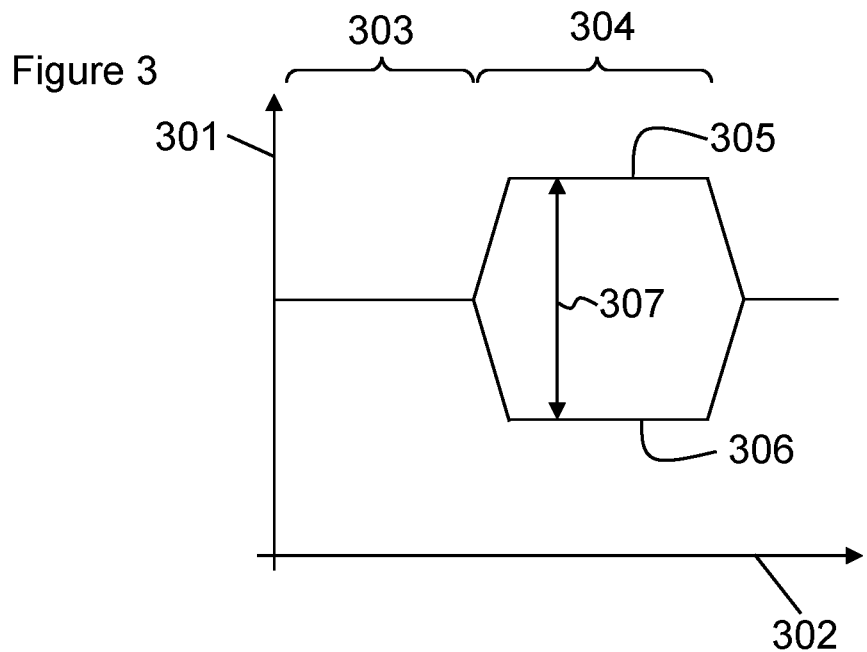
FIG. 3 shows an example signal diagram illustrating differential signalling;
  d.

FIG. 3 shows an example of the differential signals on the bus 105. The axis 301 shows voltage of the CANH and CANL wires 106, 107. The axis 302 shows time. During a first time period 303 a recessive bit (representing logic "1") is present on the bus 105. Thus, the voltage level of CANH and CANL are both at ~2.5V such that there is no differential signal between the CANH and CANL wires. During second time period 304, a transceiver 202 of one of the nodes 101-104 drives the CANH wire 106 to a high voltage level 305 and the CANL wire 107 to a low voltage level 306 such that a differential voltage signal 307 between the CANH and CANL wires, referred to as a dominant voltage (representing logic "0"), is provided. The high voltage level at 305 is typically around 3.5 V, while the low voltage level at 306 is typically around 1.5 V. The CAN protocol or, more generally, the communication scheme defines the use of these voltages to represent the data transmitted and received from the bus 105.

Errors or physical faults can occur in the CAN bus system 100 that can disrupt communication. For example, a fault may occur in the transceiver 202 or the communication bus 105.

In some instances the fault may prevent transmission or receipt of signals over one of the CANH 106 and CANL 107 wires. Thus, the other of the CANH 106 and CANL 107 wires may not have a fault. In such a circumstance, it is known for the nodes 101-104 to be configured to change to communicating by transmitting and receiving signals using the single, fault-free, bus wire 106, 107 of the bus 105 when a fault occurs that prevents the use of the usual differential signals, shown in example FIG. 3.

There are numerous methods known to those skilled in the art to identify when such faults occur. The examples that follow relate to how to react when such a fault occurs.

It has been found that in some examples, a transition to the intended single-ended communication mode can be difficult. After one of the nodes 101-104 has detected a fault, the communication mode for that node is changed to single-ended communication, which means communication takes place on one of the CANH and CANL wires 106, 107. A difficulty may be present in that all nodes should similarly and independently identify the occurrence of the faults and thereby switch to the single-ended communication mode or the change in communication mode needs to be reliably detected by all other nodes 101-104 in the network. It is not easy to ensure that under all possible failures, in any network topology, that all nodes 101-104 always detect the change in the communication mode reliably and transition accordingly to the intended single-ended communication mode at the same time.

The apparatus 202 or, in this example, the CAN transceiver 202 is configured to act in response to a fault detection signal from a fault determination device 210. In the present example, the fault detection device 210 is part of the apparatus 202 but that need not be the case. In other examples, the apparatus 202 is configured to receive the fault detection signal from a different apparatus, such as the controller 200.

In one or more examples, the fault detection signal is a signal that is internal to the apparatus 202 or internal to the node 101-104 of which the apparatus 202 forms part. Accordingly, it may not be a signal that is provided to or received from the communication bus 105.

The fault detection signal is indicative of the occurrence of a fault in at least the communication bus 105 and one or more connections, including terminals 208 and 209 between the apparatus 202 and the communication bus 105. The operation of the fault determination device 210 is not the focus of this application and it may use conventional methods to determine when a fault occurs. However, in summary, the fault detection device 210 may be configured to detect faults in one or more of the communication bus, the electrical connections that couple the apparatus 202 to the bus 105, the electrical connection(s) that couple that apparatus to the controller 200 and the electrical connection(s) in one or more network nodes 101-104. The possible faults that may have occurred to cause the generation of the fault detection signal are described below. However, the occurrence of the fault, whichever way it is detected, is signalled to the apparatus 202 by the fault detection signal.

As a non-exhaustive list, there may be one or more of a fault in the supply of power to the transceiver 202; a fault in an internal bias current in the transceiver 202; a fault in circuitry of the transmitter module 205; a fault in the circuitry of the receiver module 206; or a fault in the input/output buffers to the microcontroller 200, 201.

In other examples, there may be a fault in the wiring harness, that is the unshielded twisted pair of wires comprising CANH 106 and CANL 107. As a non-exhaustive list, there may be one or more of an: open wire or intermittent open wire on CANH or CANL; open connection contact or intermittent open connection contact at CANH or CANL; open solder joint contact or intermittent open solder joint contact at CANH or CANL; open or intermittently open solder joint contact at transmit-output terminal to TXD or receive-input from RXD at the microcontroller 200; and open or intermittently open solder joint contact at a transmit-input terminal from TXD 203 or receive-output terminal to RXD 204 at the transceiver 202.

In other examples, there may comprise a fault in the transceiver 202 to microcontroller 200 connection 203, 204 or a fault in the transceiver 202 connection to the wiring harness or bus 105, such as at terminals 208, 209 or in the stub that couples to a main part of the bus.

To summarize, the fault detection signal may be indicative of a fault comprising at least one of a physical break in one of said first and second bus wires 106, 107 of the communication bus 105 and a break in the one or more connections between the apparatus 202 and the communication bus 105.

The apparatus 202, in response to the fault detection signal, is configured to transmit a reconfiguration signal for said one or more other network nodes 101-104 coupled to the communication bus 105. The reconfiguration signal may be intended for all nodes coupled to the bus 105. The reconfiguration signal may be intended for all nodes coupled to the bus 105 that have the functionality or circuitry configured to detect it.

The reconfiguration signal is provided for transmission via at least one of said first terminal 208 and said second terminal 209. The reconfiguration signal may be provided to both terminals 208 or 209, i.e. the same signal transmitted to both terminals. In other examples, the reconfiguration signal is provided for transmission via the one of the first bus wire 106 and the second bus wire 107 that does not have the fault indicated by the fault detection signal. Thus, the fault detection signal may be indicative of which of the first bus wire 105 and the second bus wire 106 has been affected by the fault or which bus wire 106, 107 is in working order.

Accordingly, the apparatus 202 may be configured to use that information to transmit the reconfiguration signal via the first or by the second terminal 208, 209 such that it is conveyed by the working bus wire 106, 107.

In one or more examples, the reconfiguration signal is distinguishable by the one or more nodes 101-104 from the differential signalling normally present on the bus 105 by one or more signal properties that differ from those defined in the communication scheme or protocol for the differential signalling. In CAN, the CAN protocol defines the bit time and the voltages to provide to the bus wires 106, 107. In the present example, at least part of the reconfiguration signal has a high-voltage-level comprising a voltage higher than that defined in the communication scheme for said differential signalling, which may make the reconfiguration signal readily identifiable by detection circuitry of the one or more nodes 101-104. Thus, the communication scheme may define one or more voltages to be present on the first bus wire 106 or CANH as part of generation of the differential signalling. The high-voltage-level of the reconfiguration signal may be higher than the highest of those one or more voltages defined for the first bus wire 106 or CANH. Likewise, the communication scheme may define one or more voltages to be present on the second bus wire 107 or CANL as part of generation of the differential signalling. The high-voltage-level of the reconfiguration signal may be higher than the highest of those one or more voltages defined for the second bus wire 107 or CANL.

In the present example, the reconfiguration signal is configured to cause the one or more network nodes to provide for switching from use of differential signalling to single-ended signalling using only one of the first bus wire 106 and the second bus wire 107. Thus, the reconfiguration signal may provide an instruction that achieves the synchronized switching of the signalling method of the nodes to provide a transition between a bus system 100 that uses differential signalling to one that uses single-ended signalling. It will be appreciated that by "synchronized" we mean not strictly at exactly the same time but sufficiently close in time that subsequent single-ended communication will be received successfully by all of the nodes 101-104 that react to the reconfiguration signal. Thus, compared to each node 101-104 being configured to determine independently the switch from differential signalling to single-ended signalling, the use of the reconfiguration signal may, in one or more examples, provide for improved network reliability.

In one or more examples, the reconfiguration signal may be configured to achieve other actions at the one or more other nodes 101-104.

In the present example, the generation of the reconfiguration signal is provided by a reconfiguration module 211 of the apparatus 202. The reconfiguration module 211 may be configured to control the transceiver arrangement 205 to cause it to transmit the reconfiguration signal to the bus 105, as required.

Each node 101-104, including the apparatus 202, may thus provide a differential communication mode in which the transceiver arrangement 205 is configured to transmit and receive the differential signalling, and a single-ended communication mode in which the transceiver arrangement 205 is configured to transmit via a single one (the one without the fault) of the first terminal 208 and the second terminal 209 relative to a reference voltage, such as ground. The apparatus 202 or reconfiguration module 211 thereof may thus be configured to switch from the differential communication mode to the single-ended communication mode in response to said fault detection signal. The reconfiguration module 211 may be configured to provide corresponding signalling to the transceiver arrangement 205 to cause the change in the communication mode.

Figure 4:
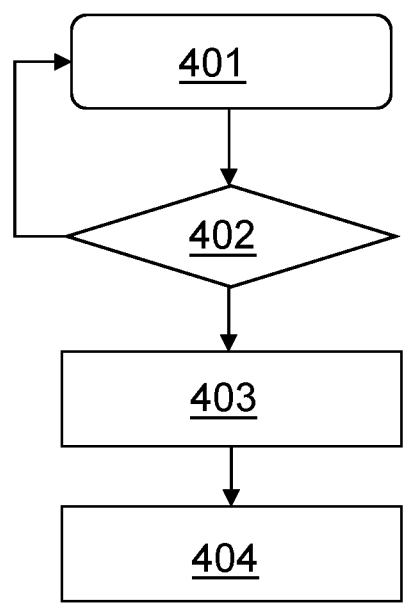
FIG. 4 shows an example flowchart illustrating the operation of the apparatus of FIG. 2;
  e.

Example FIG. 4 summarizes the operation of the apparatus 202 or the fault detection module 211 thereof. Step 401 represents the apparatus 202 being configured to transmit signalling and/or receive signalling in the differential communication mode, which may comprise the default mode for such an apparatus 202. Step 402 comprises a decision block which comprises determining if the fault detection signal has been received, which may be considered equivalent to detecting if a fault has occurred. If the answer is "no" then the method returns to step 401. If the answer is "yes" then the method proceeds to step 403, which comprises transmitting the reconfiguration signal to all other nodes coupled to the communication bus 105, at least via the working bus wire 106, 107. Step 404 represents the nodes 101-104 (i.e. all those nodes other than the node that sent the reconfiguration signal) reconfiguring themselves to adopt the single-ended communication mode. Communication between the nodes 101-104 may then continue with the nodes collectively in the single-ended communication mode.

In one or more examples, the reconfiguration signal may be configured to prompt the other nodes coupled to the communication bus 105 to switch to single-ended communication mode but it may be left to the other nodes (or transceivers 202 thereof) to determine which of the bus wires 106, 107 to use in said single-ended communication mode. In one or more other examples, the reconfiguration signal may contain information that signals to the other nodes 101-104 which of the bus wires 106, 107 to use in said single-ended communication mode.

Figure 5:
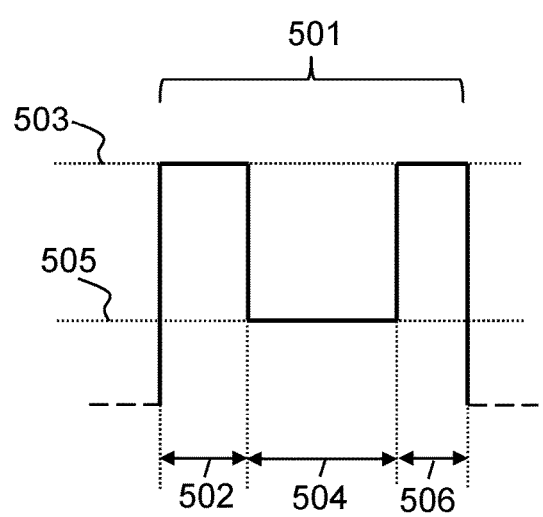
FIG. 5 show an example of the reconfiguration signal in a first signal form;
  f.
Figure 6:
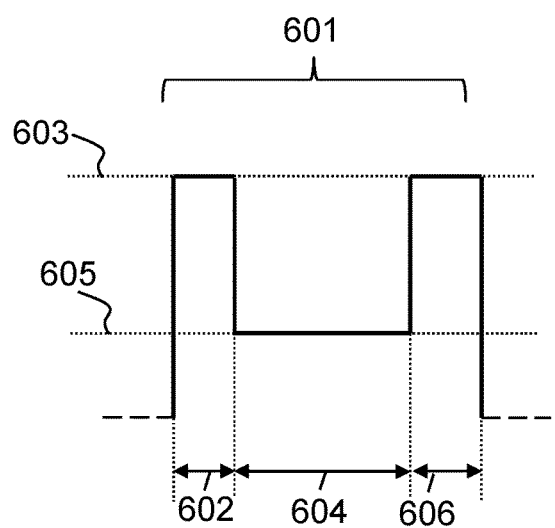
FIG. 6 show an example of the reconfiguration signal in a second signal form; and
  g.

FIGS. 5 and 6 show two examples of the form of the reconfiguration signal. Example FIG. 5 shows the reconfiguration signal having a first signal form 501. Example FIG. 6 shows the reconfiguration signal having a different, second signal form 601. By using different signal forms, the nodes 101-104 that receive the reconfiguration signal (or, more particularly, the transceivers 202 thereof) may be informed of which of the bus wires to use for the single-ended communication. Thus, the first signal form 501 may be configured to cause the one or more network nodes 101-104 to reconfigure to a single-ended signalling mode using only said first bus wire 106. The second signal form 601 may be configured to cause the one or more network nodes to reconfigure to use a single-ended signalling mode using only said second bus wire 107. It will be appreciated that the signal forms are for example only and they could signal the use of the other bus wire in other embodiments to that set out above.

Examples FIGS. 5 and 6 show the voltage of the reconfiguration signal on the vertical axis and time on the horizontal axis.

Looking first at FIG. 5, the reconfiguration signal of the first form 501 comprises a first period 502 in which the apparatus 202 provides the reconfiguration signal having a high-voltage-level 503. The first period 502 may comprise 25 microseconds, as an example only. During a directly subsequent second period 504, the reconfiguration signal is provided with a lower, positive second voltage 505. The second period 504 may comprise 35 microseconds, as an example only. During a directly subsequent third period 506, the reconfiguration signal is provided at the high-voltage-level 503 once again. The third period 506 may comprise 20 microseconds, as an example only.

Looking now at FIG. 6, the reconfiguration signal of the second form 601 comprises a first period 602 in which the apparatus 202 provides the reconfiguration signal having the high-voltage-level 603, same as voltage level 503. The first period 602 may comprise 15 microseconds, as an example only. Thus, the first period 602 is shorter than the first period 502. The duration for which the reconfiguration signal 601 is at said high-voltage-level 603 may comprise the only distinguishing feature between the first and second forms 501, 601 or may be one of a plurality of distinguishing features.

During a directly subsequent second period 604, the reconfiguration signal 601 is provided with a lower, positive second voltage 605, which in this example is the same as the second voltage 505. The second period 604 may comprise 45 microseconds, as an example only. Thus, the second period 604 is longer than the second period 504. The duration for which the reconfiguration signal 601 is at said second voltage 605 may comprise a distinguishing feature of the second form 601 of the reconfiguration signal.

During a directly subsequent third period 606, the reconfiguration signal 601 is provided at the high-voltage-level 603 once again. The third period 606 may comprise 20 microseconds, as an example only. In this and other examples, the duration of the third period 506, 606 may be the same in both signal forms 501, 601.

While the example signal forms of FIGS. 5 and 6 are only examples, more generally it can be appreciated that the signal forms comprise a "header" 502, 504 and 602, 604 that differ in form and convey the information about which bus wire 106, 107 to use in the single-ended communication mode. These headers may differ in terms of the duration 502, 602 for which the reconfiguration signal is at said high-voltage-level 503, 603. The headers may differ in terms of the duration for which the reconfiguration signal is at a lower voltage level than said high-level-voltage 503, 603 between the first period 502, 602 at the high-level-voltage and the third period 506, 606 at the high-voltage-level 503, 603.

The signal forms 501, 601 further comprise a final part 506, 606 provided to allow time for the individual nodes 101-104 in the network to reconfigure to the desired communication method. It may thereby be ensured that at the end of the reconfiguration signal (the end of the third period 506, 606), all nodes 101-104 are synchronized and reconfigured to the single-ended communication mode.

In one or more examples, the first part or period 502, 602 is configured to communicate the occurrence of the fault to the one or more other nodes. The other nodes, in response to the receipt of the first part 502, 602, may be configured to suspend differential signalling. It will be appreciated that the apparatus may also suspend transmission of differential signalling. The second part 504, 604 may comprise a delay before implementation of the single-ended communication. The one or more nodes may be configured to use the delay to perform one or more diagnostic tests and/or to provide time to switch to the single-ended communication mode. The third part 506, 606 may communicate the start of the period of single-ended communication. The nodes 101-104 may therefore be configured to begin single-ended communication at a corresponding time, in response to the receipt of the third part 506, 606.

In one or more examples, the high-voltage-level 503, 603 and second voltage level 505, 605 may be based on supply voltage levels provided to the apparatus 202. Returning to example FIG. 2, the apparatus 202 typically receives power at two voltage levels. A first power-input terminal 212 is configured to receive a first voltage from a first voltage source. The first voltage source may comprise a regulated voltage input at, for example 5 V. A second power-input terminal 213 is configured to receive a second voltage, greater than the first voltage, from a second voltage source. In an automotive setting, the second voltage source may comprise the vehicle's 12 V battery. Thus, the differential signalling provided by the transceiver arrangement 205 may be provided with reference to the first voltage and wherein the high-voltage-level is based on or comprises the second voltage, e.g. 12 V.

In other examples, the apparatus 202 may receive power at a single power input terminal and may include a power converter to provide the different voltage levels required for the reconfiguration signal.

The apparatus 202 may be configured to detect receipt of the reconfiguration signal from any of the other nodes 101-104 (or, more particularly, from apparatuses similar to apparatus 202 of those other nodes). Thus, the apparatus 202 may include reconfiguration signal detection circuitry, which may be part of module 211. The reconfiguration signal detection circuitry may comprise a comparator (not shown) configured to trigger upon receipt of a voltage above a predetermined threshold that would be exceeded by the high-voltage-level 503, 603 rather than the normal differential signalling. The reconfiguration signal detection circuitry may include a timer (not shown) for determining the duration of one or more time periods 502, 602, 504, 604 based on the occurrence or persistence of the high-voltage-level 503, 603. The determination made by the timer may determine the bus wire used by the nodes 101-104 in the single-ended communication mode.

The apparatus 202 may, based on the receipt of the reconfiguration signal from said one or more network nodes 101-104, provide for switching from use, by said transceiver arrangement 205, of differential signalling to single-ended signalling using only one of said first bus wire 106 and second bus wire 107.

Figure 7:
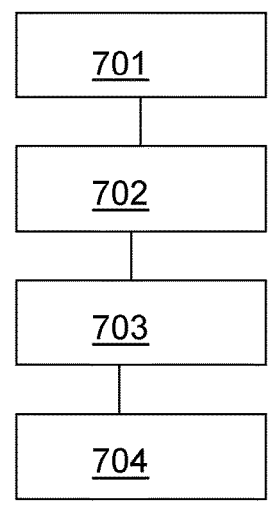
FIG. 7 shows an example flowchart illustrating the operation of a system comprising a first apparatus and a second apparatus configured to be coupled for communication by a communication bus.

We also disclose a method, shown in example FIG. 7, performed by a first apparatus 101-104 configured to couple to the first bus wire 106 and the second bus wire 107 of the communication bus 105 and at least one second apparatus 101-104 configured to couple to the first bus wire 106 and the second bus wire 107 of the communication bus 105. The first apparatus may comprise the transceiver 202 of one of the nodes 101-104. The second apparatus may comprise the transceiver 202 of a different one of the nodes 101-104.

As in the example described above, the first apparatus and the second apparatus each comprising a transceiver 202 for communicating with one another via the communication bus 105. Each transceiver 202 may be configured to provide differential signalling to the first and second bus wires according to the communication scheme and receive differential signalling from the first and second bus wires according to the communication scheme, wherein the communication scheme defines at least the voltage to be used to provide said differential signalling.

With reference to FIG. 7, the method comprises:
a. receiving 701, by the first apparatus, the fault detection signal from the fault determination device 210, the fault detection signal indicative of the occurrence of a fault in at least the communication bus and one or more connections between the first apparatus and the communication bus;
b. transmitting 702, by the first apparatus in response to receipt of said fault detection signal, a reconfiguration signal via at least one of said first bus wire and second bus wire and wherein at least part of the reconfiguration signal has a high-voltage-level comprising a voltage higher than that defined in the communication scheme for said differential signalling; and c. receiving 703 said reconfiguration signal by the second apparatus;

d. switching 704, by the second apparatus in response to said receiving of the reconfiguration signal, from transmitting and receiving of the differential signalling to transmitting and receiving single-ended signalling using only one of said first bus wire and the second bus wire.

As mentioned previously, the reconfiguration signal is provided for all nodes on the communication bus 105. Thus, in practice, there are typically a plurality of second apparatuses and the method step 703 and 704 comprise receiving, by the second apparatuses, the reconfiguration signal and collectively switching, by the second apparatuses in response to said receiving of the reconfiguration signal, from transmitting and receiving of the differential signalling to transmitting and receiving single-ended signalling using only one of said first bus wire and the second bus wire.

Further, the transmitting step 702 may comprises:

a. transmitting the reconfiguration signal having either a first signal form and a different, second signal form; and b. wherein the step of switching 704 may comprise the following:

c. switching, in response to receipt of said first signal form, to transmitting and receiving single-ended signalling using only said first bus wire; and d. switching, in response to receipt of said second signal form, to transmitting and receiving single-ended signalling using only said second bus wire.

The apparatus 202 and the bus based system 100 of which it forms part may have application in a variety of contexts. For example, the system may comprise an Antilock Braking System (ABS), an Electronic Power Steering (EPS) system, or a Heating Ventilation and Air Control (HVAC) system. The apparatus 202 may also be applied in body controllers, fuel Pumps, water pumps or oil pumps. Further, the system may comprise an automotive based system or a nonautomotive based system.

Further, although the apparatus 202 is disclosed in the context of a CAN based network, the provision of the reconfiguration signal in response to the fault determination signal by the apparatus 202 may have application in other network types, such as LIN (Local Interconnect Network), FlexRay, or Ethernet based network buses.

The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:

1. An apparatus comprising:
at least a first terminal configured to couple the apparatus to a first bus wire of a communication bus and a second terminal configured to couple the apparatus to a second bus wire of the communication bus;
a transceiver arrangement for communicating with one or more network nodes via the communication bus, the transceiver arrangement configured to provide differential signalling at the first terminal and the second terminal according to a communication scheme and receive differential signalling from the first terminal and second terminal from the communication bus according to the communication scheme, wherein the communication scheme defines at least a voltage to be used to provide said differential signalling;
the apparatus configured to:
based on a fault detection signal from a fault determination device, the fault detection signal indicative of the occurrence of a fault in at least one of the communication bus and one or more connections between the apparatus and the communication bus, transmit a reconfiguration signal, wherein the reconfiguration signal is provided for transmission via at least one of said first terminal and said second terminal for said one or more network nodes and wherein at least part of the reconfiguration signal has a high-voltage-level comprising a voltage higher than that defined in the communication scheme for said differential signalling; and
wherein said reconfiguration signal is configured to cause the one or more network nodes to provide for switching from use of differential signalling to single-ended signalling using only one of the first bus wire and the second bus wire.

2. The apparatus according to claim 1, wherein said apparatus comprises a Controller Area Network, CAN, transceiver.

3. The apparatus of claim 1, wherein the apparatus is configured to provide a differential communication mode in which the transceiver arrangement is configured to transmit and receive the differential signalling, and a single-ended communication mode in which the transceiver arrangement is configured to transmit via a single one of the first terminal and the second terminal relative to a reference voltage; and
wherein the apparatus is configured to switch from the differential communication mode to the single-ended communication mode in response to said fault detection signal.

4. The apparatus of claim 1, wherein the apparatus includes a fault detection device.

5. The apparatus of claim 1, wherein the apparatus is configured to receive the fault detection signal from a different apparatus.

6. The apparatus of claim 1, wherein the reconfiguration signal includes at least a first part and a temporally subsequent part, wherein the first part is configured to communicate the occurrence of the fault to the one or more network nodes and to cause the suspension of the transmission of differential signalling over the communication bus by the one or more network nodes; and
the subsequent part is configured to communicate the start of the period of single-ended communication.

7. The apparatus of claim 1, wherein the fault detection signal has at least a first signal form and a different, second signal form; and
wherein the first signal form is configured to cause the one or more network nodes to reconfigure to single-ended signalling using only said first bus wire; and
wherein the second signal form is configured to cause the one or more network nodes to reconfigure to single-ended signalling using only said second bus wire.

8. The apparatus of claim 7, wherein the first signal form and the second signal form differ in terms of the duration for which the reconfiguration signal is at said high-voltage-level.

9. The apparatus of claim 7, wherein the first signal form and the second signal form differ in terms of the duration for which the reconfiguration signal is at a lower voltage level than said high-level-voltage between a first period at the high-level-voltage and a second period at the high-voltage-level.

10. The apparatus of claim 1, wherein the apparatus is configured to receive a first voltage from a first voltage source and a second voltage, greater than the first voltage, from a second voltage source, wherein said differential signalling provided by the transceiver arrangement is provided with reference to the first voltage and wherein the high-voltage-level is based on the second voltage.

11. The apparatus of claim 1, wherein the reconfiguration signal is provided for transmission via the one of the first bus wire and second bus wire that does not have the fault indicated by the fault detection signal.

12. The apparatus of claim 1, wherein the apparatus is configured to:
based on receipt of the reconfiguration signal from said one or more network nodes, provide for switching from use, by said transceiver arrangement, of differential signalling to single-ended signalling using only one of said first bus wire and said second bus wire.

13. A second apparatus comprising:
at least a first terminal configured to couple the second apparatus to a first bus wire of a communication bus and a second terminal configured to couple the second apparatus to a second bus wire of the communication bus;
a transceiver arrangement for communicating with one or more network nodes via the communication bus, the transceiver arrangement configured to provide differential signalling at the first terminal and the second terminal according to a communication scheme and receive differential signalling from the first terminal and second terminal from the communication bus according to the communication scheme, wherein the communication scheme defines at least a voltage to be used to provide said differential signalling; and
the second apparatus is configured to:
based on receipt of a reconfiguration signal received from an apparatus coupled to the communication bus, provide for switching from use of differential signalling to single-ended signalling using only one of said first bus wire and second bus wire.

14. The second apparatus of claim 13, wherein said second apparatus comprises a Controller Area Network, CAN, transceiver.

15. The second apparatus of claim 13, wherein the reconfiguration signal includes at least a first part and a temporally subsequent part, wherein the first part is configured to communicate the occurrence of the fault to the one or more network nodes and to cause the suspension, by the second apparatus, of the transmission of differential signalling over the communication bus; and
the subsequent part is configured to communicate the start of the period of single-ended communication.

16. The second apparatus of claim 13, wherein the second apparatus includes a fault detection device.

17. The second apparatus of claim 13, wherein the second apparatus is configured to:
based on a fault detection signal from a fault determination device, the fault detection signal indicative of the occurrence of a fault in at least one of the communication bus and one or more connections between the second apparatus and the communication bus, transmit a reconfiguration signal, wherein the reconfiguration signal is provided for transmission via at least one of said first terminal and said second terminal for one or more network nodes coupled to the communication bus and wherein at least part of the reconfiguration signal has a high-voltage-level comprising a voltage higher than that defined in the communication scheme for said differential signalling; and
wherein said reconfiguration signal is configured to cause the one or more network nodes to provide for switching from use of differential signalling to single-ended signalling using only one of the first bus wire and the second bus wire.

18. A method performed by a first apparatus configured to couple to a first bus wire and a second bus wire of a communication bus and at least one second apparatus configured to couple to the first bus wire and the second bus wire of the communication bus, the first apparatus and the second apparatus each comprising a transceiver arrangement for communicating with one another via the communication bus, each transceiver arrangement configured to provide differential signalling to the first and second bus wires according to a communication scheme and receive differential signalling from the first and second bus wires according to the communication scheme, wherein the communication scheme defines at least a voltage to be used to provide said differential signalling;

wherein the method comprises:

receiving, by the first apparatus, a fault detection signal from a fault determination device, the fault detection signal indicative of the occurrence of a fault in at least the communication bus and one or more connections between the first apparatus and the communication bus, transmitting, by the first apparatus in response to receipt of said fault detection signal, a reconfiguration signal via at least one of said first bus wire and said second bus wire and wherein at least part of the reconfiguration signal has a high-voltage-level comprising a voltage higher than that defined in the communication scheme for said differential signalling; and receiving said reconfiguration signal by the second apparatus;

switching, by the second apparatus in response to said receiving of the reconfiguration signal, from transmitting and receiving of the differential signalling to transmitting and receiving single-ended signalling using only one of the first bus wire and the second bus wire.

19. The method of claim 18, wherein there are a plurality of second apparatuses and the method comprises receiving, by the second apparatuses, the reconfiguration signal and collectively switching, by the second apparatuses in response to said receiving of the reconfiguration signal, from transmitting and receiving of the differential signalling to transmitting and receiving single-ended signalling using only one of said first bus wire and the second bus wire.

20. The method of claim 18, wherein said step of transmitting the reconfiguration signal comprises:

transmitting the reconfiguration signal having either a first signal form and a different, second signal form; and wherein the step of switching comprises:

switching, in response to receipt of said first signal form, to transmitting and receiving single-ended signalling using only said first bus wire; and switching, in response to receipt of said second signal form, to transmitting and receiving single-ended signalling using only said second bus wire.

* * * * *